United States Patent
Hatzfeld

(10) Patent No.: US 11,994,439 B2
(45) Date of Patent: May 28, 2024

(54) SENSORS UNIT AND AIR COMPRESSOR SYSTEM WITH SUCH A SENSORS UNIT

(71) Applicant: Dürr Dental SE, Bietigheim-Bissingen (DE)

(72) Inventor: Falk Hatzfeld, Ingersheim (DE)

(73) Assignee: DÜRR DENTAL SE, Bietigheim-Bissingen (DE)

(*) Notice: Subject to any disclaimer, the term of this patent is extended or adjusted under 35 U.S.C. 154(b) by 639 days.

(21) Appl. No.: 16/660,351

(22) Filed: Oct. 22, 2019

(65) Prior Publication Data

US 2020/0132564 A1  Apr. 30, 2020

(30) Foreign Application Priority Data

Oct. 24, 2018 (DE) .................... 10 2018 126 553.0

(51) Int. Cl.
*G01L 19/00* (2006.01)
*G01M 99/00* (2011.01)

(52) U.S. Cl.
CPC ....... *G01L 19/0092* (2013.01); *G01M 99/005* (2013.01)

(58) Field of Classification Search
None
See application file for complete search history.

(56) References Cited

U.S. PATENT DOCUMENTS

| | | | | |
|---|---|---|---|---|
| 5,749,711 A * | 5/1998 | Park | ............... | E03F 5/22 417/138 |
| 5,934,904 A * | 8/1999 | Elrod | ............... | A61C 3/025 433/84 |
| 2002/0018724 A1 * | 2/2002 | Millet | ............... | G05B 9/02 417/282 |
| 2005/0046584 A1 * | 3/2005 | Breed | ............... | G06F 3/0237 340/13.31 |
| 2005/0096873 A1 * | 5/2005 | Klein | ............... | G01H 1/006 702/184 |

(Continued)

FOREIGN PATENT DOCUMENTS

DE  202004017303  1/2005
DE  60110300  1/2006
(Continued)

OTHER PUBLICATIONS

DE Office Action 05062019, German Office Action cited in the corresponding application No. 10 2018 126 553.0; dated May 6, 2019; 5 pp.

(Continued)

*Primary Examiner* — Raul J Rios Russo
*Assistant Examiner* — Carl F. R. Tchatchouang
(74) *Attorney, Agent, or Firm* — Chiesa Shahinian & Giantomasi PC

(57) ABSTRACT

A sensors unit for an air compressor system, in a mutual module housing, includes: a pressure measuring unit for measuring a pressure; at least one further measuring unit for measuring another physical and/or chemical quantity; an evaluation and control unit configured to control the pressure measuring unit for measuring the pressure and the further measuring unit for measuring the other physical and/or chemical quantity as well as to provide measurement data; and an external interface for the output of the provided measurement data.

13 Claims, 2 Drawing Sheets

(56) References Cited

U.S. PATENT DOCUMENTS

| | | | | |
|---|---|---|---|---|
| 2006/0134480 A1* | 6/2006 | Beasley | ............ | H01M 8/04507 |
| | | | | 429/444 |
| 2014/0007878 A1* | 1/2014 | Armitstead | ............ | A61B 5/087 |
| | | | | 128/204.23 |
| 2014/0214365 A1* | 7/2014 | Ligeret | ................ | F24H 9/2007 |
| | | | | 702/183 |
| 2015/0120067 A1* | 4/2015 | Wing | ................ | A61M 16/0069 |
| | | | | 700/282 |
| 2015/0233792 A1* | 8/2015 | Gao | ................... | G01M 13/045 |
| | | | | 702/35 |
| 2016/0216712 A1* | 7/2016 | Baumgartner | ............ | A61L 2/24 |
| 2017/0128689 A1* | 5/2017 | Law | .................. | A61M 16/0683 |
| 2017/0136198 A1* | 5/2017 | Delangre | .......... | A61M 16/0051 |

FOREIGN PATENT DOCUMENTS

| | | |
|---|---|---|
| DE | 102008002499 A1 | 12/2009 |
| WO | 2014094892 A1 | 6/2014 |
| WO | 2018068097 A1 | 4/2018 |

OTHER PUBLICATIONS

The heart of your practice—Dürr Dental compressors, Brochure of Dürr Dental SE; Jun. 6, 2017; 26 pp.

ESR 03232020, European Search Report cited in corresponding application No. EP19202143.4; dated Mar. 23, 2020; 6 pp.

* cited by examiner

SENSORS UNIT AND AIR COMPRESSOR SYSTEM WITH SUCH A SENSORS UNIT

RELATED APPLICATION DATA

This application claims priority to and the benefit of co-pending German national application no. 10 2018 126 553.0 filed Oct. 24, 2018. The entire contents of this prior filed application are hereby incorporated by reference herein.

BACKGROUND OF THE INVENTION

1. Field of the Invention

The invention relates to a sensors unit for an air compressor system as well as an associated air compressor system.

2. Description of the Prior Art

Air compressor systems are provided in different industrial branches as well as in the medical and dental field to supply pressurized air. In particular in the medical and dental field air compressor systems which meet certain requirements for the quality of the pressurized air are needed.

It is for instance necessary that the pressurized air used in the medical and dental field is as free of any oil residues as possible. Therefore, membrane pumps or other pumps which have little or no oil entry into the transported air, are used in such air compressor systems. In addition, corresponding dryers and/or filters are provided at various locations, in order to provide as dry and dust-free pressurized air as possible for instance at a dental work-place.

In the following and especially in relation to the invention, the term pressurized air is not only to be understood as compressed ambient air but rather in place of any and all gases and/or mixtures of gases provided with air compressor systems.

A typical air compressor system comprises first of all a compressor for generating pressurized air as well as in most cases a pressurized air tank in which the pressurized air is stored. For it has been shown that an energy efficient operation is achieved mainly by the compressor only being operated from time to time to refill the pressurized air tank instead of continuously generating the pressurized air only on demand. By doing so, any noise disturbance during operation mainly in medical and dental environments is limited to short time intervals.

Also the pressurized air is provided virtually without delay at the point of consumption due to the storage of the pressurized air.

It is known to provide a so-called pressure switch on the pressurized air tank for this intermittent operation of the compressor. The pressure switch is basically a pressure sensor with which the pressure of the pressurized air in the interior of the pressurized air tank is measured. A pressure window switching then sets a lower and an upper threshold value for the pressure. This means that as soon as the pressure in the interior of the pressurized air tank sinks below the lower threshold the compressor is activated. It remains switched on so long until the pressure in the pressurized air tank reaches the upper threshold value and is thereupon deactivated again. The pressure in the pressurized air tank thus ranges only within a predetermined pressure window.

Disadvantageous of the previous air compressor systems is a high maintenance effort since the switches controlling the compressor and connected to the pressure sensors as well as to other sensors of the entire air compressor system are commonly designed as custom-made for each respective air compressor system and therefore any maintenance can only can performed by trained personnel.

SUMMARY OF THE INVENTION

It is therefore an object of the invention foremost to provide a sensors unit for an air compressor system with which the maintenance effort can be reduced.

It is also an object of the invention to provide a corresponding air compressor system.

According to the invention, this is achieved by a sensors unit for an air compressor system, the sensors unit comprising in a mutual module housing:
a) a pressure measuring unit for measuring a pressure,
b) at least one further measuring unit for measuring another physical and/or chemical quantity,
c) an evaluation and control unit configured to control the pressure measuring unit for measuring the pressure and the further measuring unit for measuring the other physical and/or chemical quantity as well as to provide measurement data, and
d) an external interface for the output of the provided measurement data.

The inventor has recognized that a bigger problem in the maintenance of an air compressor system is the in part complex wiring of various measuring units with a central control unit. According to the invention, it is therefore useful to provide a sensors unit for measuring various physical and/or chemical quantities as a smart component in a mutual module housing. The measured pressure and the other measurement data of the at least one further measuring unit can then be provided via the mutual external interface.

By combining several various measuring units in a module housing of a sensors unit the wiring effort of the air compressor system is reduced since the various measurement data of each of the measuring units can be output at the external interface. Though the entire smart sensors unit has to therefore be replaced at once in a maintenance. Since the execution of the actual maintenance act is however more cost-intensive than providing a sensors unit the expense for the operation of the air compressor system is nonetheless reduced overall. As the reduced wiring effort results in a maintenance which is quicker to perform.

The external interface can for instance comprise an RJ45 socket so that a standard network cable known from IT systems with RJ45 plugs can be used for the coupling of the sensors unit. The external interface can also be realized as a digital interface, such as a CAN-Bus interface, and in particular provide the various measurement data in a standardized manner. Particularly the communication with the sensors unit can occur according to a uniform pattern. Thereby the output values of the various measuring units at one and the same external interface can be merged at a control device of the air compressor system in a simple manner.

It is preferably provided that the at least one further measuring unit is at least one of the following group: temperature measuring unit, humidity measuring unit, ambient pressure measuring unit, ambient temperature measuring unit, acceleration sensor, noise detection unit, pollutant measuring unit.

The advantages of the idea of the invention come into effect foremost when the sensors unit is configured to detect several different physical and/or chemical quantities. Complex conditions of the air compressor systems can thereby be detected by the sensors unit without needing further wiring effort between different measuring units and the control device. Foremost, many new evaluation possibilities arise if in addition to the conventional pressure measurement preferably two and more of the named measuring units are present.

Concerning the temperature measuring unit it should be noted that temperature compensated pressure sensors are indeed known. However, the temperature measurement for these only serves the purpose of correcting the measurement data of the pressure sensor with respect to temperature fluctuations of a measuring part contained in the measuring unit. Insofar, providing the temperature as measurement data at an external interface is not intended there, so that this does not represent a temperature measuring unit within the meaning of the present invention.

Preferably, the evaluation and control unit can be configured to perform a pre-processing of the measurement data in the sensors unit.

As a result, the measured pressure values can be processed already within the sensors unit by the evaluation and control unit. Thus, for instance a filtering of the measurement data and/or already an assessment of the measurement data can occur. An assessment of the measurement data can for instance lie therein, to not indicate as measurement data the pressure in the pressurized air tank but rather only a signal for switching the air compressor unit on and off. A filtering can for instance comprise a pressure evaluation in the frequency range.

Preferably, the evaluation and control unit comprises a microprocessor, in particular a DSP.

Most notably however, the measurement data detected by the different measuring units can be calculated against one another.

For this purpose it is preferably provided that the evaluation and control unit is configured to conduct a transformation as a function of measurement data of at least two different quantities.

For example, the dew point temperature can thereby be provided at the external interface as a processed measurement value with the aid of a measured air humidity and a measured air temperature. Or a measured absolute pressure can be transformed to a relative pressure with the help of an ambient pressure measuring unit.

Noises resulting from the operation of the air compressor system can be detected via a noise detection unit. For example, flow noises can be detected. Depending on the condition in which the air compressor system is in, for instance a leakage or other defects can be identified.

Preferably, the sensors unit comprises an acceleration sensor. Vibrations due to a false set-up and/or defects can thereby be identified.

The signal pre-processing can thereby occur in the sensor.

It is preferably provided that the evaluation and control unit is configured to receive condition information regarding the air compressor system from a higher level controller. The evaluation of the sensors unit can thereby become more precise and/or made accessible to a configuration.

For example, high-frequency portions of a detected noise while the compressor unit is running could indicate defective valves and/or defective engine mounts. After turning the compressor unit off the corresponding high-frequency portions could however suggest for instance a possible leakage as a cause for flow noises.

On the other hand, an averaging of the pressure measurement while the compressor unit is running could occur with a different time scale than outside of the running of the pump.

Preferably, the evaluation and control unit can be configured to realize more complex controlling methods for the compressor unit as a function of other or additional measurement data to the pressure. Thus, the running frequency of the compressor unit could for instance be controlled based on a pulsation of measured vibrations.

It would be further possible to no longer just control the compressor unit solely based on a predefined pressure window as previously known but rather the control device and/or the sensors unit could for instance take the dew point into account by shifting the upper shut-off threshold up or down at a certain humidity and a certain temperature.

With regards to the overall system, according to the invention an air compressor system with
  a) a pressurized air tank and
  b) a compressor,
  is provided, wherein
  c) the air compressor system comprises one of the above sensors unit.

Preferably it is provided that the sensors unit is arranged on the pressurized air tank.

Although the sensors unit in a more complex air compressor system, such as in a clinical pressurized air system, can generally be arranged at arbitrary locations within the tubing, the mounting on the pressurized air tank is advantageous. Since thereby for instance the pressure is measured directly at the storage location so that runtime delays do not arise.

Preferably it is provided that a part of the sensors unit provided with the pressure measuring unit and/or with the further measuring unit protrudes into an interior of the pressurized air tank, preferably more than approximately 1 cm.

The corresponding measuring units are thereby circum-flowed by the pressurized air so that an even more dynamic measurement can occur.

BRIEF DESCRIPTION OF THE DRAWINGS

Embodiments of the invention are explained below in more detail by means of the drawings.

DETAILED DESCRIPTION OF EMBODIMENTS

Figure 1:
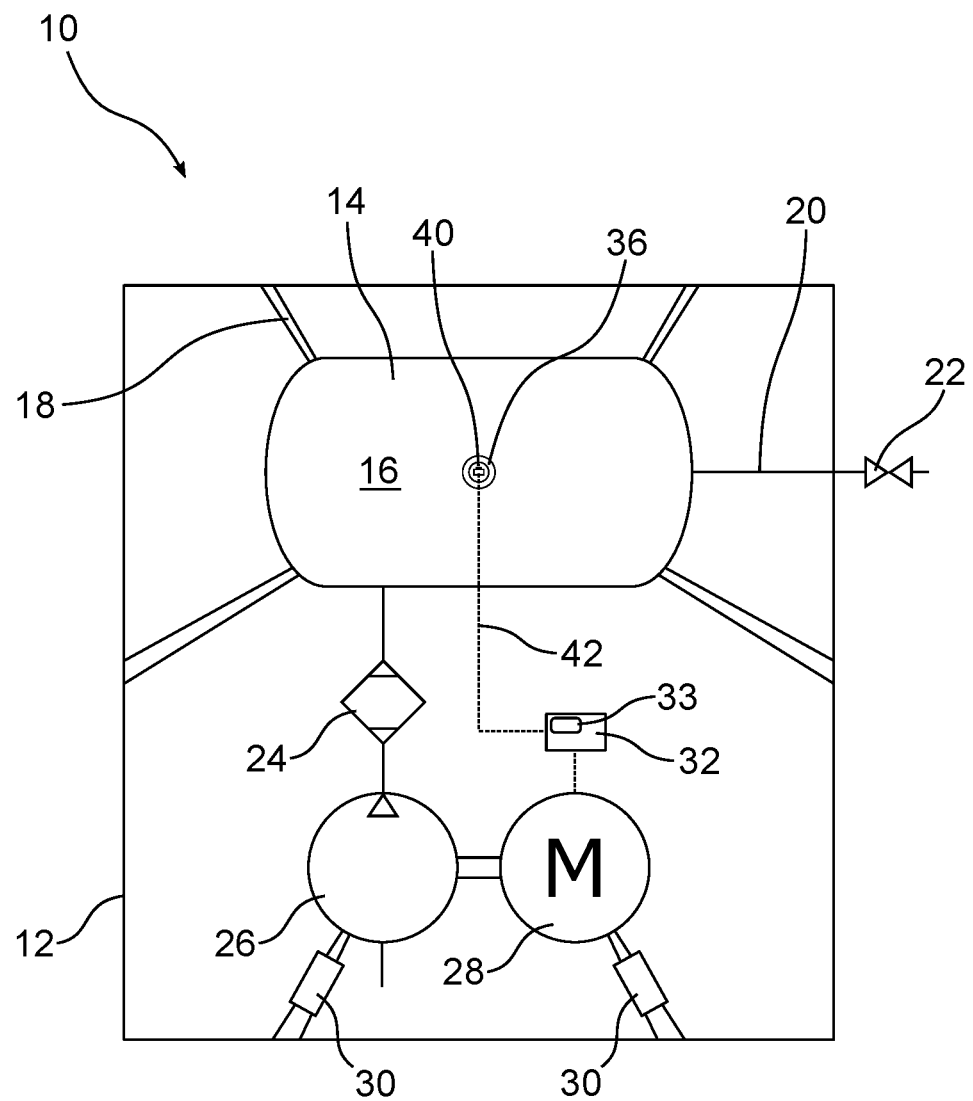
FIG. 1 shows a schematic illustration of an air compressor system according to the invention.

FIG. 1 shows an air compressor system generally provided with the reference mark 10.

The air compressor system 10 comprises a support frame 12 which supports the various assemblies of the air compressor system 10. The in FIG. 1 shown square shape of the support frame 12 is purely exemplary as the support frame 12 can be designed differently and can also feature only individual support elements not comprising the assemblies.

The air compressor system 10 first comprises a pressurized air tank 14 as a main component, in whose interior 16 the pressurized air provided by the air compressor system 10 is stored.

The pressurized air tank 14 is thereby retained on the support frame 12 via retaining means 18. An outlet conduit 20 leads from the pressurized air tank 14 to an outlet valve 22.

On the inlet side the pressurized air tank 14 is connected with a dryer 24, for instance a membrane dryer.

The dryer 24 for its part is fed on the inlet side by a compressor 26 driven by a motor 28.

The compressor 26 and the motor 28, which are usually merged as a compressor unit, are connected to the support frame 12 via dampers 30. The dampers 30 absorb vibrations occurring during the operation of the compressor 26 and in particular when starting up and stopping the motor 28.

A control device 32 for controlling the air compressor system 10 is provided, the control device 32 being electrically connected with the motor 28 as indicated by the dashed line. Moreover, the control device 32 comprises a display 33, here in the form of an LCD display, via which information regarding the operating condition of the air compressor system or the like is indicated to the operator.

Finally, the pressurized air tank 14 comprises a connecting piece 36 on which a sensors unit 40 is arranged, the end of the sensors unit 40 protruding into the interior 16 of the pressurized air container 14.

The sensors unit 40 is connected to the control device 32 via an electrical connection line 42. The connection line 42 can thereby in particular be realized as a CAN-bus line or another type of bus line.

Figure 2:
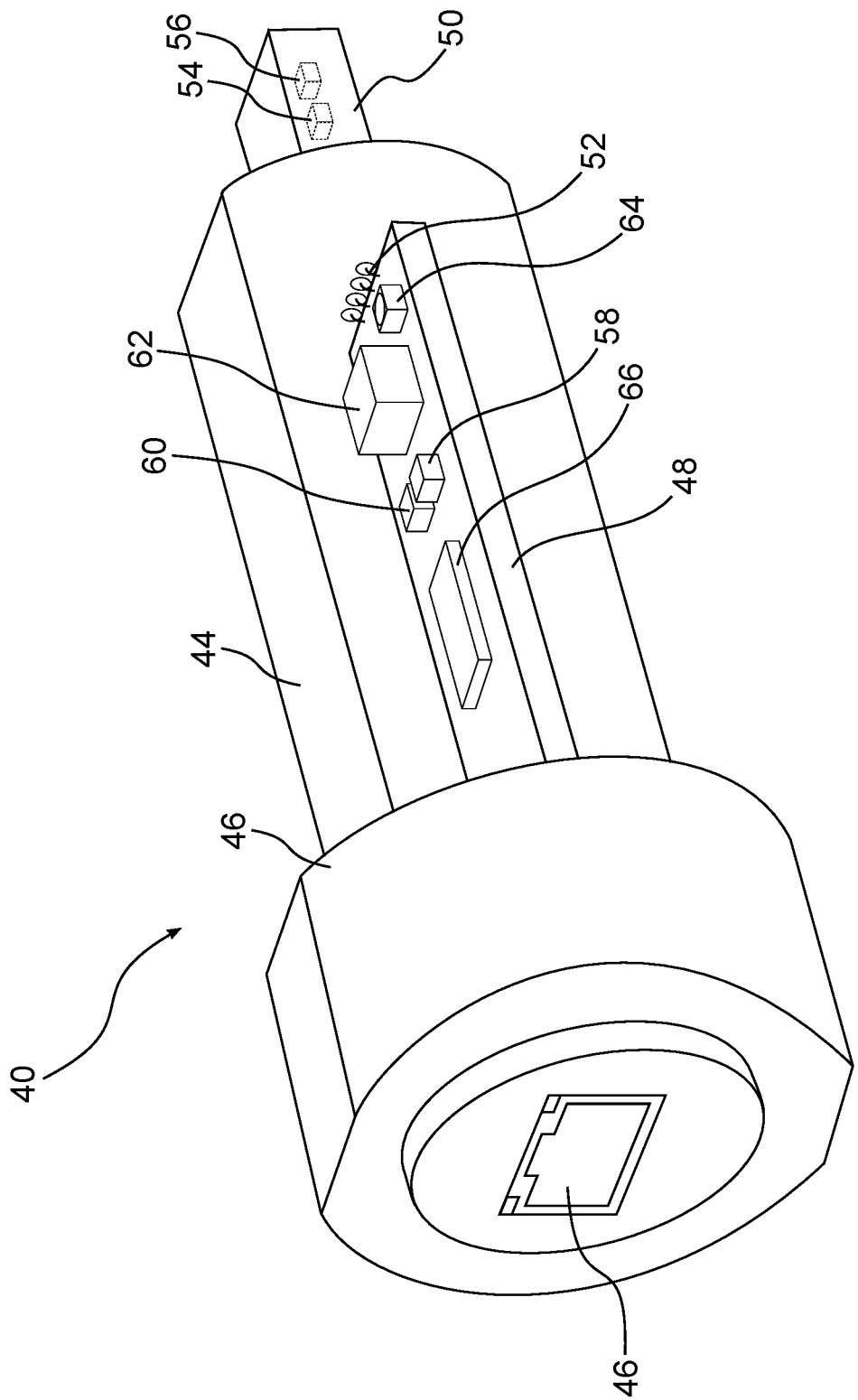
FIG. 2 shows a diagonal view of a sensors unit according to the invention for the air compressor system.

FIG. 2 shows the sensors unit 40 in detail.

Here, the sensors unit 40 comprises as a module housing for one an oblong base body 44 whose outer end is provided with a flange 45. The flange 45 serves the purpose of connecting the sensors unit 40 in the connecting piece 36 of the pressurized air tank 14.

The dimensions of the connecting piece 36 and of the sensors unit 40 are tailored to one another such that a, in a mounted state, inward facing, distal part of the sensors unit 40 protrudes into the interior 16 of the pressurized air tank 14.

Furthermore, the sensors unit 40 comprises outwardly a connection interface 46 which is realized here as an RJ45 socket.

A circuit board 48 carrying various, especially electrical, components of the sensors unit 40 is arranged in the inside of the base body 44.

First, an internal sensor block 50 connected via electrical connections 52 to the circuit board 48 arranged in the base body 44 is arranged on the distal end of the sensors unit 40, here outside of the base body 44. The internal sensor block 50 comprises here, exemplary and indicated by a dashed line, a pressure sensor 54 as well as a humidity sensor 56 as a further measuring unit in contact with the pressurized air in the interior 16 of the pressurized air tank 14.

The circuit board 48 moreover holds an ambient pressure sensor 58, a temperature sensor 60 as well as an acceleration sensor 62 as further measuring units of the sensors unit 40.

Finally, the sensors unit 40 also comprises a microphone 64 with which noises can be detected.

As a variation of the illustrated sensors unit 40, of course only some of the named measuring units can be used in various combinations.

Lastly, a microprocessor 66 as an evaluation and control unit of the sensors unit 40 is arranged on the circuit board 48, the microprocessor 66 being configured to control the individual measuring units and to provide the measured measurement data in raw form and/or in processed form at the connection interface 46.

The air compressor system 10 functions as follows:

The microprocessor 66 determines the pressure of the pressurized air in the interior 16 of the pressurized air tank 14 with the aid of the pressure sensor 54. This is then transmitted from the sensors unit 40 to the control device 32. If the pressure falls below a predetermined lower target value then the control device 32 activates the motor 28, whereby said motor 28 starts up and drives the compressor 26. The control device 32 deactivates the motor 28 as soon as the pressure reaches an upper target value.

The control device 32 also signals to the sensors unit 40 if the compressor 26 is in operation mode or in idle mode.

More complex measurements and evaluations are possible as the sensors unit 40 comprises further measuring units other than the pressure sensor 54.

Thus the sensors unit 40 can determine the moisture content of the pressurized air in the pressurized air tank 16 with the aid of the humidity sensor 56. Furthermore the temperature can be determined with the aid of the temperature sensor 60. The microprocessor 66 can then be configured to calculate the dew point as a temperature value based on these values.

Thereby the sensors unit 40 can indicate the dew point to the control device 32 so that a further evaluation respectively a conversion does not have to take place there.

The control device 32 for its part can thereupon indicate to the operator, for instance on the display 33, that the dryer 24 needs to be maintained (for instance by exchanging the membrane) and/or can control said dryer 24 if applicable via a condensate drain valve in regards to a more intense drying respectively activate a regeneration cycle. As an increasing dew point can indicate a malfunction of the dryer 24.

Because the sensors unit 40 protrudes into the interior 16 of the pressurized air tank 14, the pressure sensor 54 and the humidity sensor 56 are constantly circumflowed by the pressurized air. The reaction of the sensors unit 40 to changes in the corresponding values occurs therefore directly because the measurement occurs at the significant location, namely in the storage volume of the air compressor system 10. This is to be viewed as contrary to the systems known hitherto, in which a simple pressure sensor was connected to the pressurized air tank 14 via a hose line and therefore longer reaction times were prevalent.

Furthermore, the sensors unit 40 can detect changes in the vibration behaviour of the pressurized air tank 14 and foremost of the parts connected thereto based on the measurement data of the acceleration sensor 62. Since due to the coupling of the pressurized air tank 14 as well as of the compressor 26 and of the motor 28 to the support frame 12, the vibrations coming from the compressor 26 and the motor 28 are also transferred to the pressurized air tank 14. There they are then detected by the sensors unit 40. The sensors unit 40 can then be configured to identify if the dampers 30 still meet the requirements and/or if the compressor 26 and/or the motor 28 have an operating problem such as an imbalance.

In this manner it can be displayed on the display 33 on the control device 32 that a maintenance of the dampers 30, of the compressor 26 and/or of the motor 28 is necessary or will be necessary soon.

Furthermore, the sensors unit 40 can for instance detect faulty valves on the compressor 26 or at another location of the air compressor system 10 based on the evaluation of noises detected by the microphone 64. For instance, a whistling noise possibly together with a pressure loss can indicate a leakage.

During all of these evaluations the detected measurement data is processed in the sensors unit 40 via the microprocessor and is transferred to the connection interface 46 in a format appropriate for the same. The data can thereby be transferred as raw data as well as in an already partially or completely processed manner.

Thus it is for instance conceivable that it is only indicated at the connection interface 46 if the dew point is reached or not instead of transferring all measurement data needed to determine the dew point to the control device 32.

The sensors unit 40 can also incorporate information it receives from the control device 32 regarding the operating condition of the compressor 26 in its internal evaluations. Further feedback information is also conceivable here.

The sensors unit 40 therefore represents an intelligent component which overall only needs to be controlled and queried by the control device 32 so that the control device 32 does not need to know the details of the comprised measuring units. This simplifies the layout of the control device 32.

If the sensors unit 40 internally detects an error in one of its own measuring units or its control electronics, then this is also indicated to the control device 32, which in turn controls the display 33 accordingly.

A maintenance technician can then easily mount a new sensors unit 40 on the connecting piece 36 of the pressurized air tank 14 as only a single module component with all measuring units has to be replaced. This exchange is further simplified by the fact that only one electrical interface detachable without tools has to be disconnected and reconnected.

The invention claimed is:

1. A sensors unit for an air compressor system for supplying pressurized air for the medical and dental field, the sensors unit, in a mutual module housing, comprising:
    a) a pressure sensor configured to measure a pressure,
    b) at least one further sensor configured to measure another physical and/or chemical quantity,
    c) an evaluation and control unit comprising a microprocessor, the microprocessor configured to receive a signal from the pressure sensor of a pressure measurement and receive a signal from the further sensor of an other measurement of the other physical and/or chemical quantity, the evaluation and control unit further configured to provide measurement data of the pressure measurement and the other measurement, and
    d) an external interface for output of the provided measurement data,
    wherein the evaluation and control unit is configured to output the provided measurement data based on both the pressure sensor and the at least one further sensor in raw form and/or in processed form at the external interface, and wherein the mutual module housing comprises an outer end and a distal end, the distal end opposite the outer end, wherein the outer end is provided with a flange, the flange configured to connect the mutual module housing to a pressurized air tank, wherein the microprocessor is between the outer end and the distal end, and wherein the mutual module housing is configured to interact with the pressurized air.

2. The sensors unit according to claim 1, wherein the at least one further sensor is at least one of the following group: a temperature sensor; a humidity sensor; an ambient pressure sensor; an ambient temperature sensor; an acceleration sensor; a noise sensor; or a pollutant sensor.

3. The sensors unit according to claim 1, wherein the evaluation and control unit is configured to perform a pre-processing of the measurement data in the sensors unit.

4. The sensors unit according to claim 3, wherein the evaluation and control unit is configured to conduct a transformation as a function of measurement data of at least two different measuring units.

5. The sensors unit according to claim 1, wherein, as the at least further sensor, a humidity sensor for measuring the humidity and a temperature sensor for measuring the temperature are provided, and wherein the evaluation and control unit is configured to determine the dew point from the measurement data and to provide the dew point at the external interface.

6. The sensors unit according to claim 1, wherein, as the at least one further sensor, an acceleration sensor is provided, and wherein the evaluation and control unit is configured to identify defects at the compressor unit from the measurement data.

7. The sensors unit according to claim 1, wherein, as the at least one further sensor, a noise sensor is provided, and wherein the evaluation and control unit is configured to identify defects at the compressor unit and/or a leakage in the air compressor system from the measurement data.

8. The sensors unit according to claim 1, wherein the pressure sensor and the at least one further sensor comprise a sensor block, wherein the sensor block is arranged on the distal end of the mutual module housing.

9. An air compressor system comprising:
    a) a pressurized air tank; and
    b) a compressor,
    wherein the air compressor system includes a sensors unit according to claim 1.

10. The air compressor system according to claim 9, wherein the sensors unit is arranged on the pressurized air tank.

11. The air compressor system according to claim 10, wherein a part of the sensors unit provided with the pressure sensor and/or with the at least one further sensor protrudes into an interior of the pressurized air tank.

12. The air compressor system according to claim 11, wherein the part of the sensors unit protrudes in the interior of the pressurized air tank by about 1 cm (0.39 in) or more.

13. The air compressor system according to claim 9, wherein the pressure sensor and the at least one further sensor comprise a sensor block, wherein the sensor block is arranged on the distal end of the mutual module housing.

* * * * *